Oct. 14, 1958  P. A. DUNN, JR  2,855,797
AUTOMOBILE DRIVE CONTROL
Filed Oct. 23, 1953  2 Sheets-Sheet 1

INVENTOR.
PAUL A. DUNN, JR.
BY
Beau, Brooks, Buckley & Beau,
ATTORNEYS.

Oct. 14, 1958
P. A. DUNN, JR
2,855,797
AUTOMOBILE DRIVE CONTROL
Filed Oct. 23, 1953
2 Sheets-Sheet 2
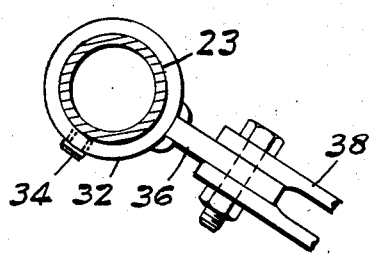
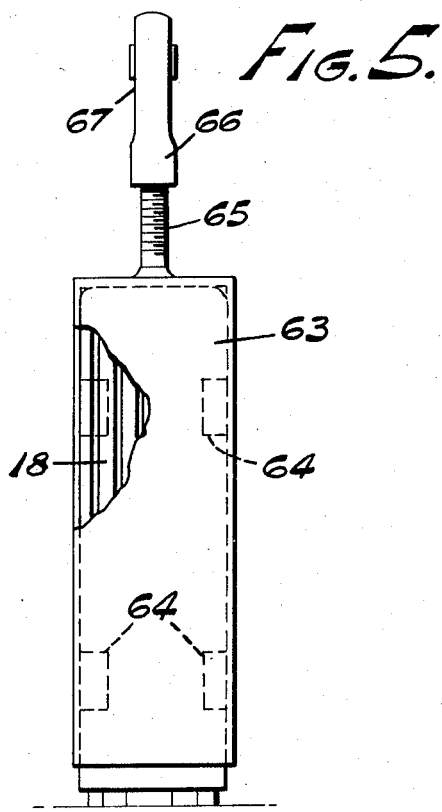
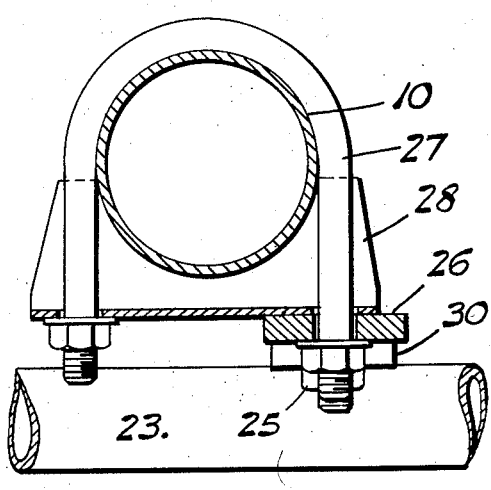
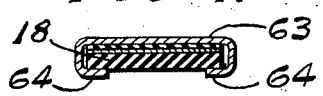
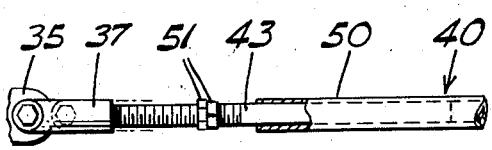
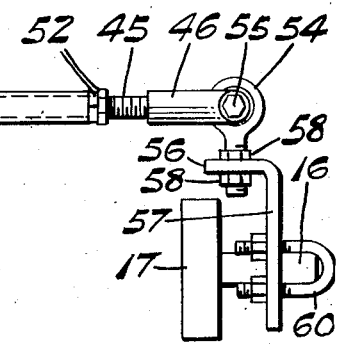
INVENTOR:
PAUL A. DUNN, JR.
BY
Bean, Brooks, Buckley & Bean,
ATTORNEYS.

United States Patent Office 2,855,797
Patented Oct. 14, 1958

2,855,797
AUTOMOBILE DRIVE CONTROL

Paul A. Dunn, Jr., Kenmore, N. Y., assignor of one-half to Robert K. Gillen, Snyder, N. Y.

Application October 23, 1953, Serial No. 387,831

7 Claims. (Cl. 74—484)

This invention relates to control means for operating an automotive vehicle and particularly to control means which render it possible to operate an automotive vehicle entirely by the use of the operator's hands, dispensing with the usual necessity for operating certain of the driving controls with the feet.

In the operation of present day motor vehicles equipped with automatic or semi-automatic transmissions the principal controls requiring foot operation are the service brake pedal and the accelerator pedal. The present invention relates to control means for an automotive vehicle whereby the entire operation of the vehicle is accomplished by hand controls. This is accomplished, speaking generally, by providing hand control means for operating the service brakes of the vehicle and the fuel or carburetor throttle control.

In one particular form of the present invention the control means includes connections which extend directly to the usual foot brake pedal and the usual foot accelerator pedal. However, in one aspect the present invention relates generally to the hand control arrangement set forth herein and the function accomplished thereby, irrespective of whether the control elements are directly connected to the above two foot pedals or whether they are otherwise connected to effect operation and control of the usual hydraulic brake master cylinder and the carburetor throttle control mechanism.

In the prior art various proposals have been put forth whereby hand control means are provided for effecting operational functions which are usually under foot control or operation but such prior art devices have been generally unsuccessful and unsatisfactory because of cumbersome operating requirements, undue mechanical complexity, and difficulty in installation or adapting a motor vehicle to the use thereof.

The present invention provides a hand control mechanism for braking and throttle control which is extremely simple and direct. Accordingly, the operator can operate a vehicle equipped with the control means of the present invention with virtually no preliminary instruction, assuming such operator is familiar with ordinary vehicle operation, and the control means provides a single operating member for both the brake pedal and the accelerator pedal, or more broadly, for operating the hydraulic services brakes and the carburetor throttle control. Furthermore, this single operating element has a normal neutral position and brake and throttle operating positions which are directly opposite to each other positionally and the hand control portion moves substantially lineally so that a single direct movement from braking position to throttle opening position or from throttle opening position to braking position is provided.

A further important advantage of the present invention resides in its mechanical simplicity which combines economy of manufacture and installation and relative freedom from the mechanical trouble which generally results when complicated linkages and mechanisms are relied upon to accomplish similar purposes. Furthermore, the device or mechanism of the present invention may be applied to present-day motor vehicles of various manufacture and various models by means of minor adjustments and adaptations of a basic control mechanism.

In fact, in the form shown herein by way of example, the control means may be packaged as a complete kit which a user may carry with him and apply to various vehicles, as in the case of rental vehicles, for instance. The fact that the control means of the present invention may be readily applied to and removed from a vehicle without alteration or defacement of the vehicle is an important factor in this type of use.

The mechanism of the present invention further provides simple adjusting means which permit ready adjustment of the control means after and during installation in a vehicle to accommodate and take care of slightly varying conditions, as for instance when the brake linings wear and the brake operating position accordingly changes slightly.

A further feature of the present invention resides in the fact that the effective lever arms of the hand control means may readily be varied to suit varying physical requirements of operators and varying force requirements for operating the braking and throttle controlling elements of the vehicle. As an instance of the latter requirement, the return springs of braking mechanisms and throttle control mechanisms vary considerably in force and accordingly require varying manual forces for operation.

Furthermore, an important feature and attribute of the control means of the present invention is the fact that the presence of the present novel control mechanism does not in any way interfere with operation of the vehicle in the usual manner by foot control of the brake mechanisms and the throttle control mechanism. Thus, the control mechanism of the present invention need not be removed if the vehicle is to be used by persons who desire to control the vehicle in the usual manner without resort to the mechanism of the present invention.

A single specific embodiment of the principles of the present invention is set forth in detail in the following specification and in the accompanying drawings. However, it is to be understood that such specific embodiment is set forth by way of example only and that the principles of the present invention may be varied substantially in their application and may be present in various mechanical embodiments. The exemplary form set forth herein is merely illustrative and the principles of the present invention are not limited thereto or otherwise than as defined in the appended claims.

In the drawings:

Fig. 3 is a view similar to Fig. 2 but showing only the brake control portion of the mechanism on a somewhat larger scale and with a portion thereof broken away for added illustration;

Fig. 4 is a fragmentary cross-sectional view on the line IV—IV of Fig. 2 on a somewhat enlarged scale;

Fig. 5 is a detailed view of the accelerator pedal and connected control means;

Fig. 6 is a detailed cross-sectional view on the line VI—VI of Fig. 2 on a somewhat enlarged scale; and Fig. 7 is a cross-sectional view through the accelerator pedal shown in Fig. 5.

Figure 1:
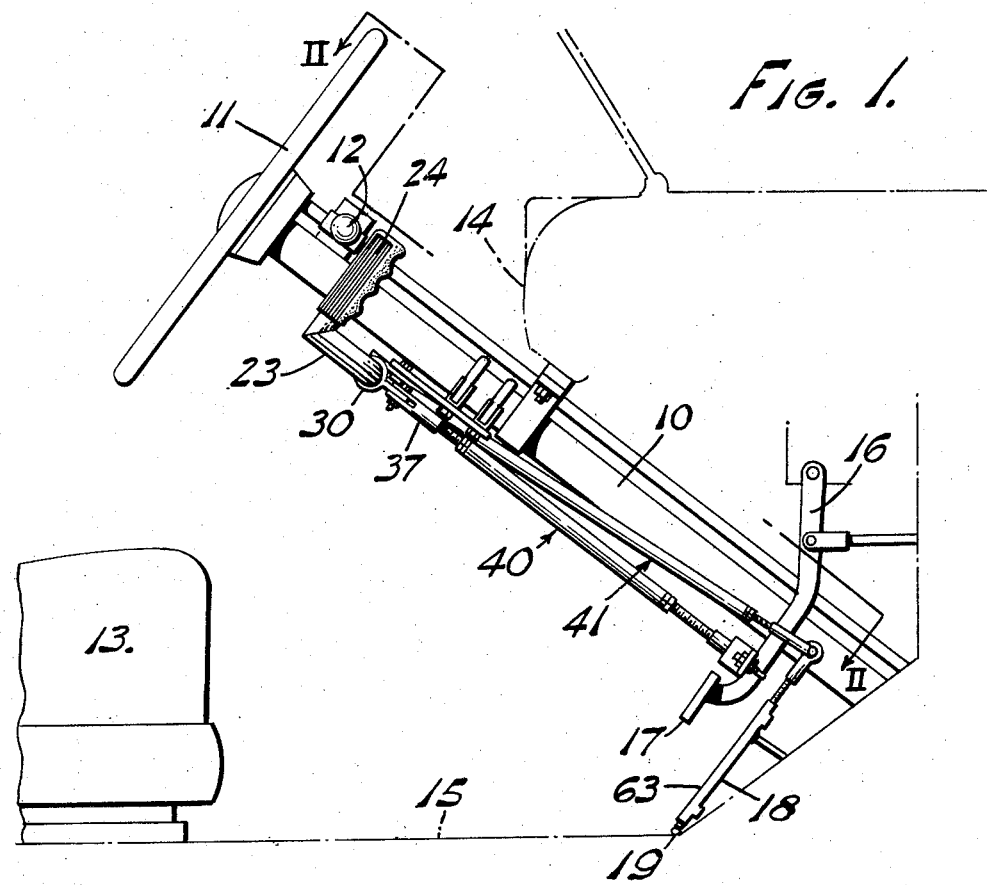
Fig. 1 is a somewhat schematic side elevational view of the steering wheel and driver's portion of the interior of a motor vehicle with one form of the operating control means of the present invention embodied therein.
Figure 2:
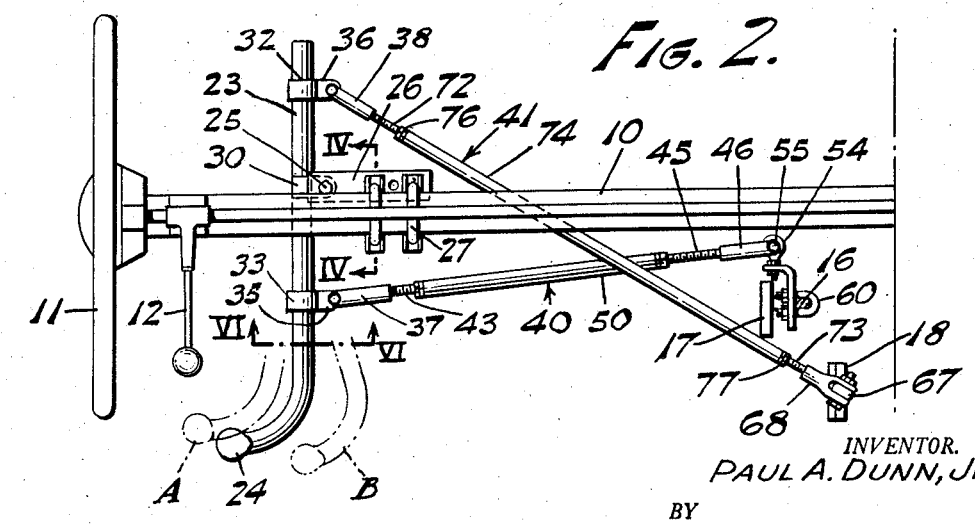
Fig. 2 is an oblique plan view of the steering wheel and control means of Fig. 1 viewed approximately as indicated by the broken line II—II of Fig. 1.

Throughout the several figures of the drawings like characters of reference denote like parts and, referring particularly to Figs. 1 and 2, the numeral 10 designates a conventional automotive vehicle steering column having a steering wheel 11 and a transmission control lever 12 associated therewith, the transmission being preferably, but not necessarily, of the automatic or semi-automatic type. In Fig. 1 the front or operator seat of the vehicle is indicated fragmentarily at 13, the instrument panel is indicated in dot-and-dash lines at 14 and the floor of the vehicle at 15.

The numeral 16 designates a lever or arm portion of a conventional foot brake operating pedal and the numeral 17 designates the foot pad or treadle portion thereof. In the present instance the brake operating lever is of the suspended type but the mechanism of the present invention is applicable equally to brake pedal levers of the type which extend upwardly from the floor of the vehicle. In Figs. 1 and 2 the numeral 18 designates a conventional accelerator pedal hinged to the floor of the vehicle as indicated at 19.

As indicated generally in the preamble hereto, an important advantage of the device of the present invention resides in the fact that it may be readily applied to or removed from most conventional automotive vehicles of the present day without modification of any part of the motor vehicle itself or any of its conventional control equipment and without defacement of the vehicle or its conventional control equipment.

The mechanism of the present invention comprises essentially a pivoted hand control lever and novel connections between such lever and the brake controlling and throttle controlling systems or portions of the vehicle. In the present instance the manual control lever is designated 23 and comprises an elongated tubular member terminating in a grip or handle portion 24. Control lever 23 is pivoted as at 25 to a plate 26 which is clamped to steering column 10 by means of U-bolts 27 and semicircular clamp brackets 28, all as clearly shown in detail in Fig. 4.

Pivotal connection of control lever 23 with supporting plate 26 is by means of an encircling clamp member 30 in the same general way as shown in detail in Fig. 6 in connection with the accelerator connection of the control lever, so that clamp 30 may be adjusted along control lever 23 and may also be adjusted angularly with respect thereto.

Referring to Fig. 2, the numerals 32 and 33 designate, respectively, clamp members which serve as fulcrum connections for the fuel or throttle control connection and the brake control connection, respectively. The clamp 32 is shown in detail in Fig. 6 and the clamp 33 is identical therewith. As shown in Fig. 6 clamp 32 encircles control lever 23 and is provided with a socket head setscrew designated 34 or any other desired means for adjustable locking the encircling clamp portion of control lever 23. Clamps 33 and 32 each include a lug designated 35 and 36 respectively, which lugs give pivotal support to a pair of yoke members 37 and 38, respectively.

The yokes 37 and 38 provide the upper or control lever end connections for a pair of push rod assemblies designated generally 40 and 41, respectively, in Figs. 1 and 2. The brake control push rod 40 is shown in somewhat greater detail in Fig. 3 and, referring thereto, a rod 43 has a threaded end portion which is threaded into the end of yoke 37 and this threaded connection serves as an endwise or length adjustment for push rod assembly 40. A similar threaded-end rod 45 at the other or lower end of push rod assembly 40 threads into a similar yoke 46 which connects with the vehicle braking mechanism in a manner which will presently be described. This lower rod element 45 likewise may be threaded into and out of yoke 46 for lengthwise adjustment of the push rod assembly.

The facing ends of the rods 43 and 45 extend slidably into the opposite ends of a tube or sleeve member 50.

The threaded portion of rod 43 is provided with a nut and lock nut combination 51 and the threaded portion of rod 45 is likewise provided with a nut and lock nut combination 52. In normal neutral position the opposite ends of tube 50 abut against the nut and lock nut combinations 51 and 52, the latter being selectively adjustable along the threaded portions of rods 43 and 45 to accurately adjust the control mechanism by adjusting the effective length of the push rod assembly.

Referring to Fig. 3, yoke 46 has pivotal connection with an eyebolt 54 as at 55 and the threaded shank portion of eyebolt 54 is secured to a flanged end portion 56 of an anchoring plate 57 as by means of nuts 58. The body portion of anchoring plate 57 is fixed to the lever or arm portion of the brake control pedal as by means of a U-bolt 60. The anchoring plate 57 may be of various forms and may comprise a straight plate element in which case eyebolt 54 will have its axis lying substantially along an extension of the axis of push rod 40.

In the present form of the invention the throttle control push rod 41 connects at its lower end with the accelerator pedal of the vehicle. Referring to Fig. 5 a plate member 63 has returned bent ears 64 which extend beneath accelerator pedal 18 and thus retain plate member 63 against the upper face of accelerator pedal 18. This connection member may be merely slid onto the accelerator pedal 18 from the upper free end thereof.

Plate member 63 has an upwardly extending screw element 65 rigidly associated therewith and screw element 65 threads into an internally threaded portion 66 of an eye member 67. The bearing portion of the eye member 67 is received between the ends of a yoke 68. The yokes 38 and 68 of the fuel control push rod assembly 41 have adjustably threaded therein the outer ends of a pair of rod members 72 and 73, respectively, which correspond to the rod members 43 and 45 of the brake control push rod assembly. The facing ends of rod members 72 and 73 engage slidably or telescopically within a tubular member 74 and the effective pushing length of push rod assembly 41 is determined by pairs of nut and lock nut combinations 76 and 77.

The pivotal connections of the yokes 46 and 68 with the eyebolt 54 and eye member 66, respectively, are by means of self-aligning ball bearings which permit limited axial displacement of the pivotal connections. Accordingly the general axial alignments of the pivotal connections may be established by initial angular adjustment of the clamp members 32 and 33 and initial angular adjustment of the eyebolt 54 as by means of the securing nuts 58, and the self-aligning ball bearings furnish limited universal pivotal connections of the lower ends of each of the push rods 40 and 41, such universal pivotal tolerance being of a degree sufficient to permit free operation of the pivotal connections as required by the swinging movement of the brake pedal lever, the accelerator pedal and the control lever 23.

When control lever 23 is in the neutral position illustrated in full lines in Fig. 2, the push rod assemblies, when properly adjusted, are in such condition that the various nut and lock nut assemblies are in abutment with opposite ends of the push rod tubes 50 and 74. Throttle opening movement of control lever 23 is effected by manual movement thereof toward the dot-and-dash line position illustrated at A in Fig. 2 which transmits a direct pushing movement through push rod assembly 41 to the accelerator pedal and leaves the brake control mechanism unaffected, since rod 43 can merely telescope outwardly from tube 50 as clearly shown in Fig. 3.

In the form of push rod construction shown herein by way of example either of the rods 43 or 45 could withdraw from tube 50 upon throttle opening movement of the control lever 23 or the necessary telescopic outward movement could be divided between the rods 43 and 45. If there is any tendency of one or the other of the rods to bind in the tube 50 by reason of faulty adjustment or minor misalignment, the other of the rods 43 or 45 affords the necessary telescoping movement.

It will be clear from the foregoing that movement from any throttle open position to a braking position is effected merely by a direct rocking movement of control lever 23 from the dot-and-dash line position A to the second dot-and-dash line position designated B in Fig. 2. After control lever 23 passes the neutral position shown in full lines in Fig. 2 in a braking operation, the rod assembly 40 functions as a rigid push rod to transmit further rocking movement of control lever 23 to the brake mechanism and the push rod 41 elongates idly by withdrawing movement of either or both of the rod members 72 and 73 from tube 74 in the same manner as has just been described in connection with the brake control push rod assembly 40.

In the form shown herein by way of example the usual return springs of the foot throttle control pedal and the service brake pedal will serve to move control lever 23 to the normal full-line position illustrated in Fig. 2 and will retain the lever in such position unless and until it is manually operated in one direction or the other.

What is claimed is:

1. In a motor vehicle, hand control means for braking and fuel control comprising a fulcrumed hand control lever, a pair of extensible push rods pivotally connected with said lever at opposite sides of its fulcrum, means connecting one of said push rods with the vehicle motor fuel control system and means connecting the other of said push rods with the service brake control system, each of said push rods having an extensible play connection whereby operation of said lever to push either of said push rods is accompanied by idle extension movement of the other push rod.

2. In a motor vehicle, control means for braking and fuel control comprising a hand control lever, fulcrum means detachably securable to the upper portion of a vehicle steering column for pivotally supporting said lever, a pair of extensible push rods pivotally connected with said lever at opposite sides of its fulcrum, means connecting one of said push rods with the vehicle motor fuel control system and means connecting the other of said push rods with the service brake control system, each of said push rods having an extensible play connection whereby operation of said lever to push either of said push rods is accompanied by idle extension movement of the other push rod.

3. In a motor vehicle, means for braking and fuel control comprising a fulcrumed hand control lever, a pair of push rods comprising telescoping members, each of said push rods being pivotally connected at one end with said lever at opposite sides of its fulcrum, one of said push rods being pivotally connected at its opposite end with the vehicle motor fuel control system and the other of said push rods being pivotally connected at its opposite end with the service brake control system, each of said push rods having extensible telescoping movement whereby operation of said lever to push either of said push rods is accompanied by idle extension movement of the other push rod.

4. In a motor vehicle, control means comprising a fulcrumed hand control lever, a pair of push rods comprising telescoping members, each of said push rods being pivotally connected at one end with said lever at opposite sides of its fulcrum, clamp means detachably securable to the brake and accelerator pedals of a vehicle, one of said push rods being pivotally connected at its opposite end with the accelerator pedal clamp means and the other of said push rods being pivotally connected at its opposite end with the brake pedal clamp means system, each of said push rods having extensible telescoping movement whereby operation of said lever to push either of said push rods is accompanied by idle extension movement of the other push rod.

5. In a motor vehicle, hand control means for braking and fuel control comprising a fulcrumed hand control lever, a pair of extensible push rods pivotally connected with said lever at opposite sides of its fulcrum, clamp means detachably securable to the brake and accelerator pedals of a vehicle, means connecting one of said push rods with the accelerator pedal clamp means and means connecting the other of said push rods with the brake pedal clamp means, each of said push rods having an extensible play connection whereby operation of said lever to push either of said push rods is accompanied by idle extension movement of the other push rod.

6. In a motor vehicle, control means for braking and fuel control comprising a hand control lever, fulcrum means detachably securable to the upper portion of a vehicle steering column for pivotally supporting said lever, a pair of extensible push rods pivotally connected with said lever at opposite sides of its fulcrum, said fulcrum pivot means and said push rod pivotal connections being adjustable lengthwise of said control lever, means connecting one of said push rods with the vehicle motor fuel control system and means connecting the other of said push rods with the service brake control system, each of said push rods having an extensible play connection whereby operation of said lever to push either of said push rods is accompanied by idle extension movement of the other push rod.

7. In a motor vehicle, control means for braking and fuel control comprising a hand control lever, a fulcrum means detachably securable to the upper portion of a vehicle steering column for pivotally supporting said lever, a pair of extensible push rods pivotally connected with said lever at opposite sides of its fulcrum, said push rod pivotal connections being adjustable lengthwise of said control lever, means connecting one of said push rods with the vehicle motor fuel control system and means connecting the other of said push rods with the service brake control system, each of said push rods having an extensible play connection whereby operation of said lever to push either of said push rods is accompanied by idle extension movement of the other push rod.

References Cited in the file of this patent

UNITED STATES PATENTS

| | | |
|---|---|---|
| 1,551,696 | Reynolds | Sept. 1, 1925 |
| 2,489,727 | Shipley | Nov. 29, 1949 |
| 2,602,348 | Wilson | July 8, 1952 |
| 2,620,050 | Menard | Dec. 2, 1952 |
| 2,707,886 | Lerman | May 10, 1955 |

FOREIGN PATENTS

| | | |
|---|---|---|
| 669,963 | Great Britain | Apr. 9, 1952 |